United States Patent [19]
McChesney

[11] 3,888,501
[45] June 10, 1975

[54] HAND TRUCK AND WHEEL-BARROW COMBINATION

[76] Inventor: Vernon H. McChesney, 3314 Dumas St., San Diego, Calif. 92106

[22] Filed: Mar. 27, 1974

[21] Appl. No.: 455,118

[52] U.S. Cl. ........ 280/47.18; 280/47.27; 280/47.31; D12/24
[51] Int. Cl. .................. B62b 1/12; B62b 1/20
[58] Field of Search .......... 280/47.18, 47.27, 47.31; 214/384, 372; D12/24

[56] References Cited
UNITED STATES PATENTS

| | | | |
|---|---|---|---|
| 1,559,646 | 11/1925 | Roemer | 280/47.31 |
| 2,242,068 | 5/1941 | Harris | 280/47.31 |
| 2,579,077 | 12/1951 | Hubner | 280/41.18 |
| 2,843,393 | 7/1958 | Dahlander et al. | 280/47.27 X |
| 3,046,035 | 7/1962 | Nichols | 280/47.27 |
| 3,059,784 | 10/1962 | Chamberlain et al. | 214/384 X |
| 3,350,797 | 11/1967 | Dassinger et al. | 280/47.18 X |

Primary Examiner—David Schonberg
Assistant Examiner—John A. Pekar

[57] ABSTRACT

A hand truck and wheelbarrow combination in which a hand truck is provided having two wheels with solid rubber tires, the truck bed being of standard dimensions with an elongated rams horn shaped handles which are substantially circular in shape and cover more than 180° of a circle; a mounting bar adjustably coupled to the undercarriage of the truck bed and a tube removably coupled to the adjustable bar for converting the hand truck into a wheelbarrow.

1 Claim, 5 Drawing Figures

PATENTED JUN 10 1975　　　SHEET 2　　　3,888,501

HAND TRUCK AND WHEEL-BARROW COMBINATION

BRIEF DESCRIPTION OF THE INVENTION

The present invention relates to a hand truck and a wheelbarrow combination and more particularly to a hand truck and wheelbarrow combination which is convertible from one to the other.

According to the invention, a convertible hand truck is provided having a conventionally dimensioned bed with elongated circular handles shaped similar to a ram's horn. The handles are substantially circular in geometric shape and represent more than 180° in arcuate length. Hence, when the hand truck is leaned over, a curved outside portion of the handles is in tangential relationship with the resting surface. A mounting bar is adjustably coupled to the undercarriage of the hand truck bed and a tub is provided which is removably attached to the bar. Hence, due to the configuration of the elongated handles, a single bed can serve as a hand truck bed or a wheelbarrow bed.

An object of the present invention is the provision of a convertible hand truck.

A further object of the invention is the provision of a hand truck which is convertible into a wheelbarrow.

Yet another object of the invention is the provision of a convertible hand truck which is inexpensive to manufacture and extremely convenient in use.

Other objects and many of the attendant advantages of the present invention will be readily appreciated as the same becomes better understood by reference to the following detailed description when considered in connection with the accompanying drawings in which like reference numerals designate like parts throughout the Figures thereof and wherein.

DETAILED DESCRIPTION OF THE DRAWING

Figure 1:
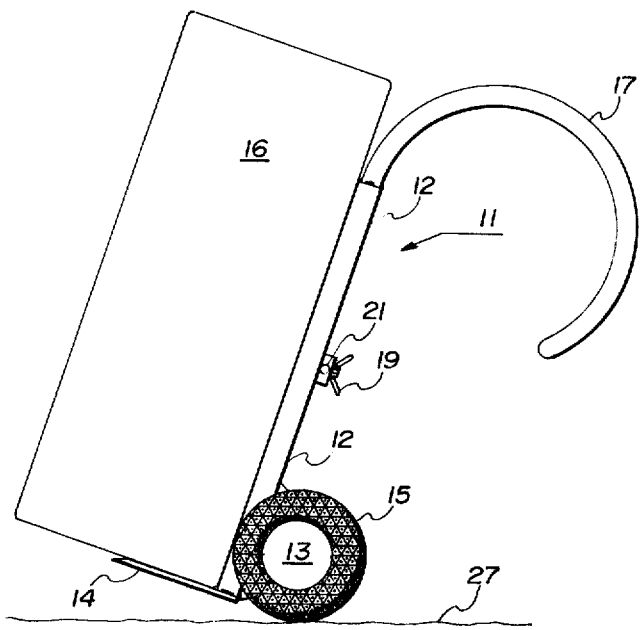
FIG. 1 is a side elevational view of the present invention utilized as a standard hand truck.

Referring to FIG. 1, a convertible hand truck is shown generally at 11 having a truck bed 12 with a wheel 13 rotatably coupled thereto carrying solid rubber tire 15. Load platformm 14 is coupled to truck bed 13 and carries load 16 thereon. Extended handles 17 are coupled to and extend from the top of truck bed frame 12 and are roughly circular in shape covering over 180° of a circle.

Figure 2:
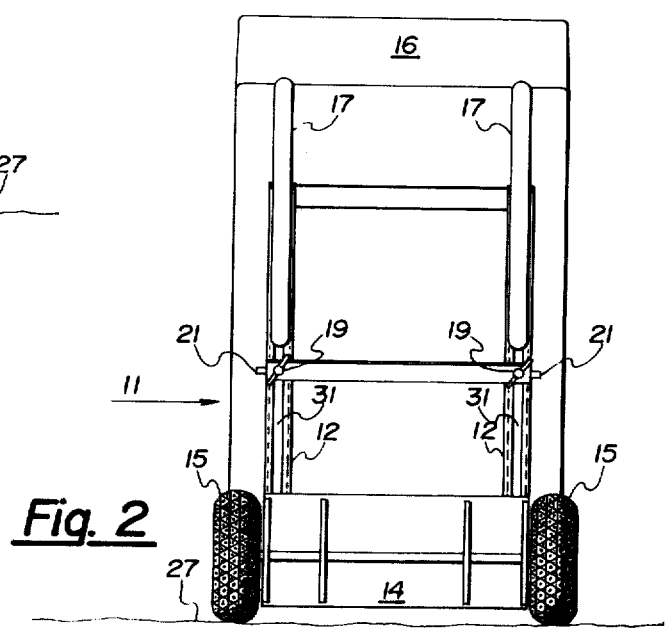
FIG. 2 is a back elevational view of the embodiment of FIG. 1.

Referring to FIG. 2, the convertible hand truck 11 is again shown with a truck bed frame 12 and solid tubber tires 13. Extended circular handles 17 are coupled to and extend from the top portion of truck bed frame 12. A mounting bar 18 is adjustably coupled to frame 12 and positioned via wing bolts 19. Latch extensions 21 are carried by coupling bar 18.

Figure 3:
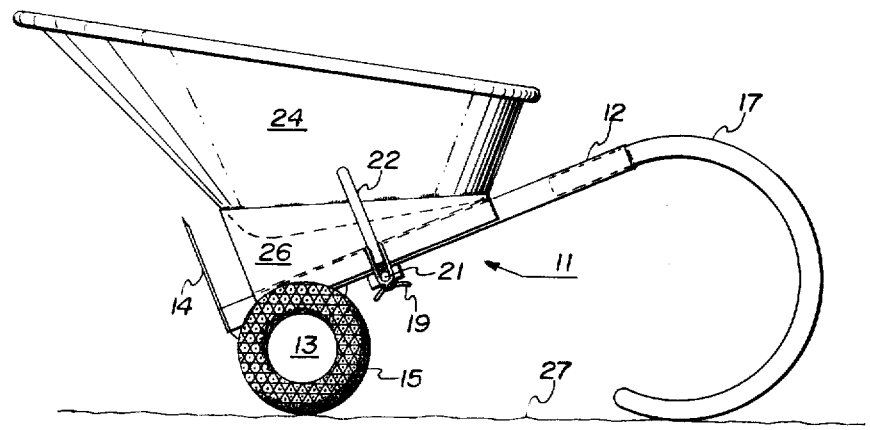
FIG. 3 is a side elevational view of the convertible hand truck of the present invention converted w th a wheelbarrow attachment thereon.

Referring to FIG. 3, convertible hand truck 11 is shown with wheel 13 rotatably coupled thereto. Truck bed frame 12 terminates in an extended round handle portion 17. Snap latch 22 is shown latched to latch extension 21. Wheelbarrow tub 24 is carried by bracket 26 and carries snap latch 22. Rounded handle 17 is shown in tangential relationship with supporting surface 27.

Figure 4:
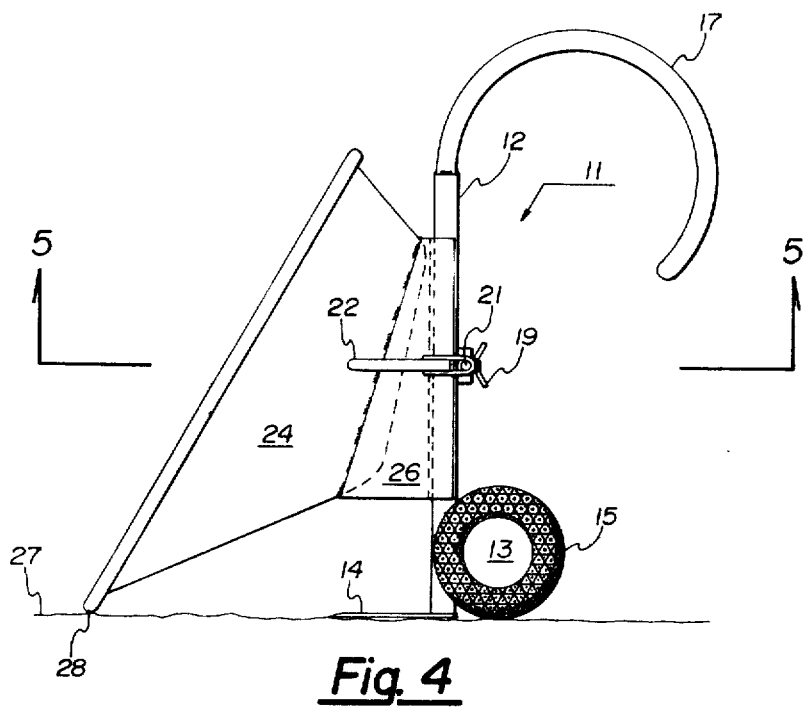
FIG. 4 is a side elevational view of the embodiment of FIG. 3 in an upright position.

Referring to FIG. 4, a convertible hand truck 11 is shown in a vertical position with leading edge 28 of tube 24 resting on supporting surface 27.

Figure 5:
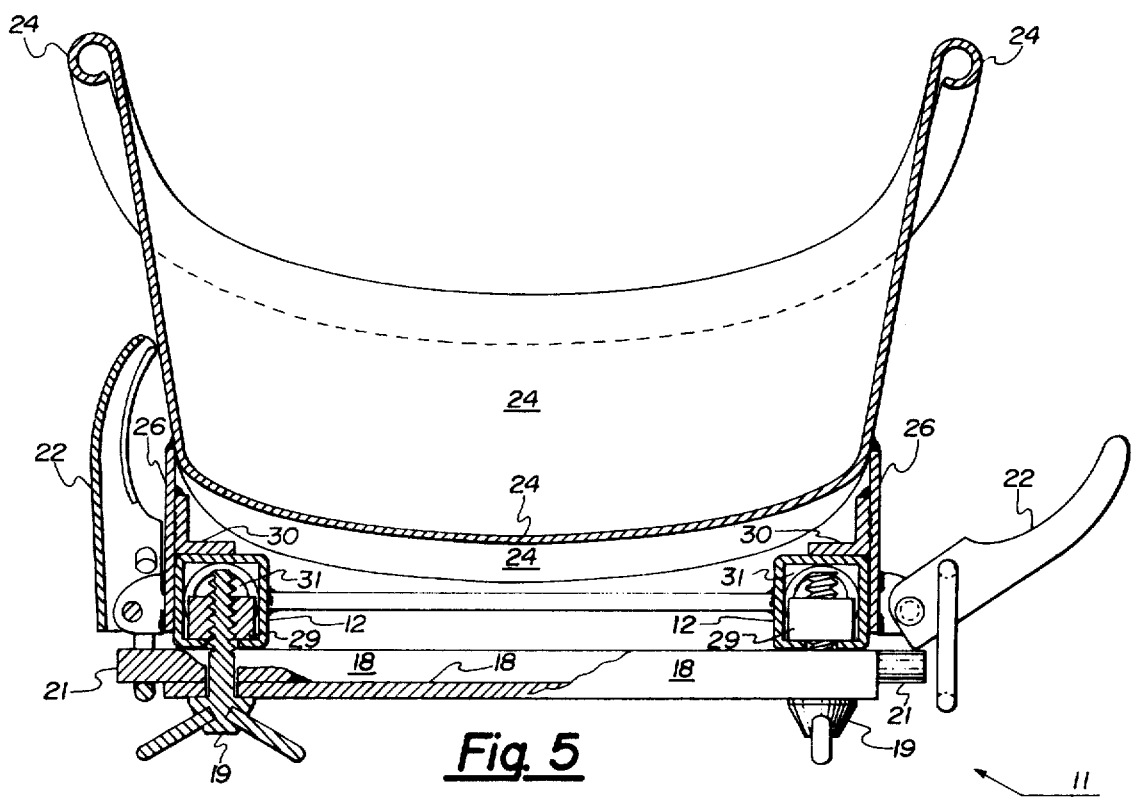
FIG. 5 is an end elevational view of the embodiment of FIG. 3 illustrating the coupling means between the wheelbarrow attachment and the hand truck.

Referring to FIG. 5, wing bolts 19 are shown in threadable engagement with captured nuts 29 which are held captive within races 31. Races 31 are fixedly attached to the frame bed of convertible hand truck 11. Snap latches 22 are shown in operable proximity with snap latch extensins 21 for latching mounting bar 18 to tub 24.

Referring back to all of the Figures, it can be seen that convertible hand truck 11, though the utilization of extended circular handles 17, can be utilized either in the upright position, as shown in FIGS. 1 and 2, for operation as a conventional hand truck, or in the wheelbarrow position illustrated in FIG. 3 for operation in the wheelbarrow mode through the attachment of tub 24. It can also be seen that via the adjustment bar 18, the wheelbarrow tub attachment 24 is adjustably carried by the truck bed 12 which can be adjusted for a convenient dumping disposition as shown in FIG. 4. This, of course, is due to the simple snap-latch construction and the captured nut-wing bolt arrangement as shown in FIG. 5. The solid rubber tires have been added to facilitate ease in handling for yardwork for example. The extended circular handles 17 also prevent gouging from the ends of the handles since when the handles are rested on a supporting surface in FIG. 3 they are in a tangential relationship with the supporting surface.

It should be understood, of course, that the foregoing disclosure relates to only a preferred embodiment of the invention, and that it is intended to cover all changes and modifications of the example of the invention herein chosen, for the purposes of the disclosure, which do not constitute departures from the spirit and scope of the invention.

The invention claimed is:
1. A hand truck comprising:
   a truck bed frame;
   a loading platform coupled to the bottom of the truck bed portion;
   first and second wheels rotatably coupled to a bottom portion of said truck bed frame;
   first and second handles attached to and projecting upwardly from said truck bed frame, said first and second handles being substantially circular and more than 180° in arcuate length;
   a mounting bar adjustably coupled to the truck bed frame;
   a wheelbarrow tub removably coupled to said mounting bar; and
   first and second parallely disposed races carried by the undercarriage of said truck bed frame;
   first and second nuts slidably carried by said first and second races, respectively;
   first and second apertures in said mounting bar disposed over said first and second nuts; and
   first and second wing bolts passing through said first and second apertures, respectively, and in threadable engagement with said first and second nuts, respectively.

* * * * *